E. W. IRISH.
BRAKE LEVER LOCK FOR AUTOMOBILES.
APPLICATION FILED JUNE 7, 1919.
1,330,117.
Patented Feb. 10, 1920.
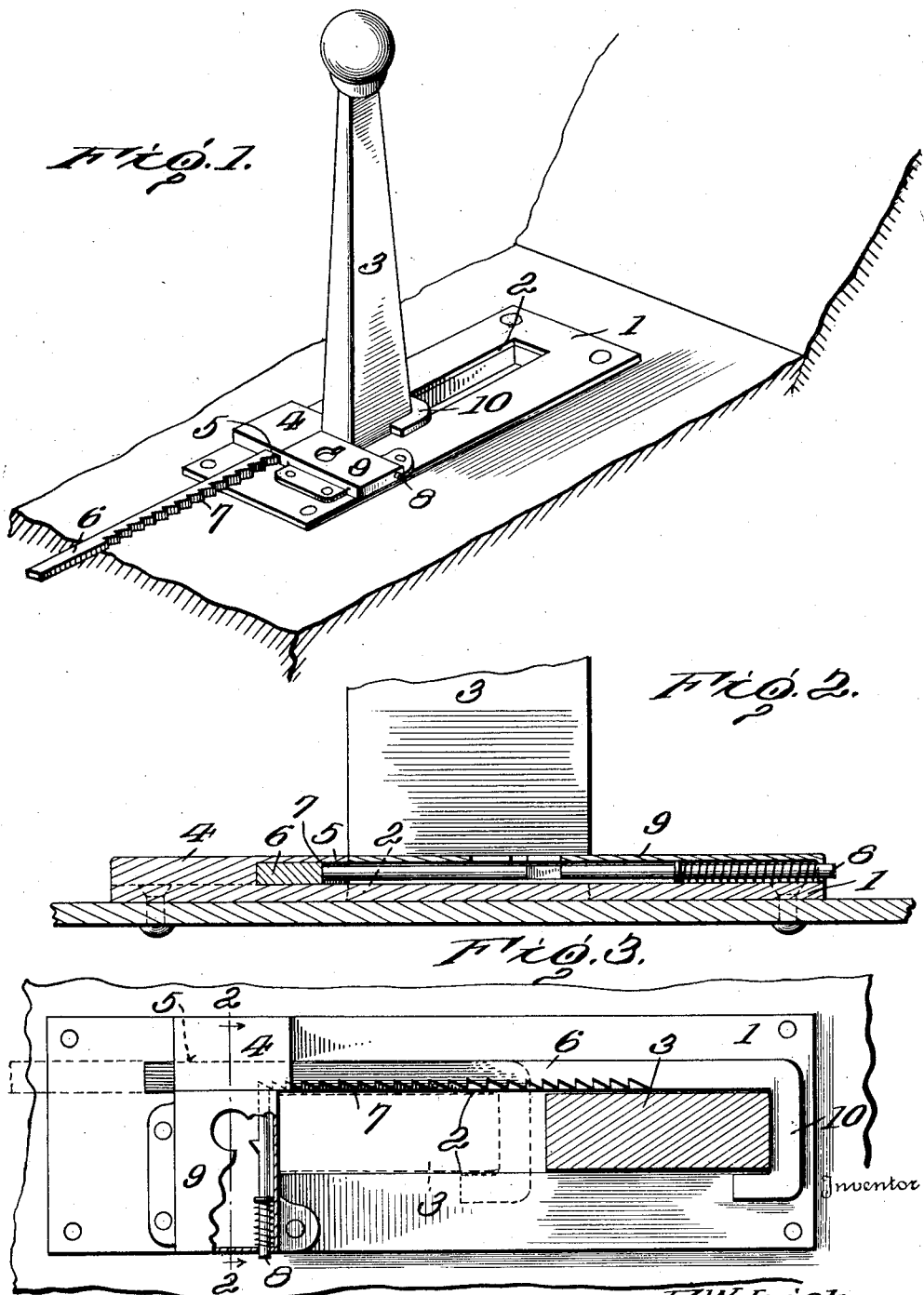

UNITED STATES PATENT OFFICE.

ELWOOD W. IRISH, OF RICHMOND, VIRGINIA.

BRAKE-LEVER LOCK FOR AUTOMOBILES.

1,330,117.   Specification of Letters Patent.   Patented Feb. 10, 1920.

Application filed June 7, 1919. Serial No. 302,381.

*To all whom it may concern:*

Be it known that I, ELWOOD W. IRISH, a citizen of the United States, residing at Richmond, in the county of Henrico and State of Virginia, have invented certain new and useful Improvements in Brake-Lever Locks for Automobiles, of which the following is a specification, reference being had therein to the accompanying drawing.

This invention relates to certain new and useful improvements in locking devices for automobiles, the object being to provide a locking device which is exceedingly simple and cheap in construction and one which can be readily placed in position in an automobile so as to rigidly lock the emergency brake in order to prevent the car from being moved.

Another and further object of the invention is to provide a locking device which is adapted to be placed under the mat of the footboard of the automobile over the slot through which the emergency brake extends so that the brake lever can be locked with the brake set in order to prevent the car from being moved.

Another and further object of the invention is to provide a brake in which a sliding toothed bar is employed coöperating with the locking bolt of a lock so that when the bolt is moved it will be locked automatically in adjusted position over the brake lever in order to prevent the same from being moved.

A still further object of the invention is to provide a construction which enables the locking bar to be moved by the brake lever when released from the lock.

Other and further objects and advantages of the invention will be hereinafter set forth and the novel features thereof defined by the appended claims.

In the drawings—

Figure 1 is a perspective view of my improved construction of locking device showing the application of the same to an automobile, and Fig. 2 is a transverse section through the same.

Fig. 3 is a plan view.

In carrying out my invention I employ a plate 1 which is preferably in the form of a casting having a slot 2 which is adapted to be arranged over the slot in the footboard of an automobile through which the emergency brake 3 extends. The plate 1 is rigidly secured to the footboard by bolts or rivets, as clearly shown. The housing 4 is formed integral with the casting or plate 1 having a guideway 5 in which is slidably mounted a locking bar 6 having a serrated or toothed portion 7 adapted to be engaged by a spring actuated bolt 8 of a lock 9 which is rigidly secured to the plate at the end of the slot, as clearly shown, whereby the bar 6 will be locked in its adjusted position for the purpose hereinafter fully described.

The bar 6 terminates in a hooked portion 10 working over the slot and adapted to embrace the brake lever 3 so as to prevent the same from being moved.

In use the plate 1 is fixed to the footboard of the automobile under the mat and the locking bar with its hooked end is moved out of the path of travel of the emergency brake to allow the brake to be used in the ordinary manner. When it is desired to lock the automobile the emergency brake is set and the hooked end of the locking bar is moved longitudinally of the slot until the brake lever is engaged thereby, the spring actuated bolt of the lock allowing the bar to be moved so that when the same has been moved into engagement with the brake lever it will be locked by the bolt of the lock. The automobile will then be locked so that it will be impossible to move the same, and when it is desired to release the locking device a key is inserted into the lock so as to move the spring actuated bolt 8 out of the path of travel of the locking bar 6, and by forcing the brake lever forward so as to release the brakes the locking bar will be carried forward with the same so that the brake can be used in the ordinary manner.

What I claim as new is: —

1. The combination with the foot board of an automobile having a slot through which extends an emergency brake lever, of a locking bar having a hooked end extending across said slot and capable of embracing said lever, and a spring actuated lock controlled bolt arranged to engage said locking bar for holding the hooked end of said locking bar in the path of travel of said emergency lever.

2. The combination with the footboard of an automobile having a slot through which extends an emergency brake lever, of a plate arranged over said slot having a slot registering therewith, said plate having a housing provided with a guideway, a serrated locking bar mounted in said guideway having a hooked end extending over the slot thereof and adapted to embrace the brake lever, and a lock fixed to said plate having a spring actuated bolt coöperating with the serrated edge of said locking bar.

3. The combination with an automobile having a slotted footboard through which extends an emergency brake lever, of a plate affixed to said footboard having a slot registering therewith and through which the emergency brake lever extends, said plate having a guideway formed thereon, a locking bar slidably mounted in said guideway having a serrated edge, a lock fixed on said plate having a spring actuated bolt coöperating with the serrated edge of said locking bar, said locking bar having a hooked end extending across the slot of said plate and adapted to embrace the emergency brake lever for locking said lever in set position.

In testimony whereof I hereunto affix my signature.

ELWOOD W. IRISH.